United States Patent
Hoogeveen et al.

(10) Patent No.: US 7,409,919 B2
(45) Date of Patent: Aug. 12, 2008

(54) SELF PROPELLED CLEANING DEVICE FOR MARINE SEISMIC STREAMERS

(75) Inventors: Jeroen Hoogeveen, Heemstede (NL); Arne Høeg, Oslo (NO); Øyvind Overskeid, Langhus (NO); Sigmund Øvereng, Oslo (NO); Waldemar Nowakowski, Tärnäsen (NO); Kenneth Karlsen, Oslo (NO)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/716,243

(22) Filed: Mar. 9, 2007

(65) Prior Publication Data

US 2008/0127875 A1      Jun. 5, 2008

Related U.S. Application Data

(63) Continuation-in-part of application No. 11/633,266, filed on Dec. 4, 2006, now abandoned.

(51) Int. Cl.
    *B63G 8/00* (2006.01)
(52) U.S. Cl. ............................ 114/312; 134/6; 367/15
(58) Field of Classification Search ................ 114/312; 367/14, 15, 153, 154; 134/6
    See application file for complete search history.

(56) References Cited

U.S. PATENT DOCUMENTS 7,145,833 B1   12/2006   Hoogeveen

2006/0054186 A1 *   3/2006   Lepage et al. .................. 134/6

FOREIGN PATENT DOCUMENTS

| GB | 2 411 197 | 11/2003 |
|---|---|---|
| GB | 2 411 297 | 8/2005 |
| GB | 2 430 142 | 9/2006 |
| WO | WO 2004/051316 | 6/2004 |

OTHER PUBLICATIONS

Richard Collins, British Search Report, Feb. 20, 2008.

* cited by examiner

*Primary Examiner*—Lars A Olson
(74) *Attorney, Agent, or Firm*—E. Eugene Thigpen; Richard A. Fagin (57) ABSTRACT

A cleaning device for a seismic streamer includes a housing placeable the exterior of the streamer. A turbine is associated with the housing and is configured to be rotationally driven by movement of the streamer through a body of water. A drive element is associated with the housing and is configured to convert rotational motion of the turbine to motive power to move the housing along the streamer. At least one cleaning element is associated with the housing and is cooperatively engaged with the exterior of the seismic streamer. A method for cleaning a streamer includes towing the streamer through the water. Motion of water is converted into motive power to move a cleaning device along the streamer.

19 Claims, 6 Drawing Sheets

SELF PROPELLED CLEANING DEVICE FOR MARINE SEISMIC STREAMERS

CROSS-REFERENCE TO RELATED APPLICATIONS

This application is a continuation-in-part (CIP) of U.S. patent application Ser. No. 11/633,266 filed on Dec. 4, 2006, which is now abandoned.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying apparatus. More specifically, the invention relates to apparatus for cleaning marine growth and other contaminants from seismic sensor streamers.

2. Background Art

Marine seismic surveying includes having a seismic vessel tow one or more seismic sensor streamers near the surface of a body of water, such as the ocean. Sensor streamers are essentially cables that include a plurality of seismic sensors (usually hydrophones) disposed along the cable at spaced apart locations. The sensors may be protected from water intrusion by enclosing the cable and the sensors in a water tight, acoustically transparent jacket. The interior of the jacket is typically filled with oil, or electrically non-conductive, viscous gel-like materials, both to enable good acoustic coupling between the water and the hydrophones, and to provide electrical insulation between various electrical components, including the hydrophones, in the streamer.

Typical seismic streamers can extend for a substantial distance behind the towing vessel, often several kilometers. As is the case for many devices operated in a body of water, various marine life forms, such as barnacles and seaweed, can become attached to the exterior of seismic streamers. Other contaminants may also become attached to the exterior of the streamer as well. The presence of such contaminants on a streamer, in addition to causing possible deterioration of the streamer, can cause changes in the response of the various sensors in the streamer because the life forms can interfere with transmission of seismic energy through the jacket and to the sensors therein. Such marine growth and other contaminants may cause noise in detected seismic signals and increase the drag. Cleaning such contaminants from the exterior of a streamer is therefore important.

Streamers can be cleaned of such attached marine growth and other contaminants using conventional methods such as brushing and scraping. Such conventional cleaning methods typically require the streamer to be retrieved from the water. Retrieval typically includes spooling or winding the streamer on a suitable winch or similar device. The streamer must then be transported to a facility where it may be unspooled and then cleaned conventionally. Such conventional cleaning procedures can be difficult and expensive to perform, and may require that the streamer be removed from service for a considerable period of time. Alternatively, a streamer can be scraped or cleaned manually from a boat moved alongside the streamer while the streamer is deployed in the water. Such cleaning operations can be difficult to perform, dangerous to personnel in the event of unexpected rough water, and, depending on the skill of the cleaning operator, may risk damage to the streamer.

One type of automatic streamer cleaning device is described in International Patent Application Publication No. WO 2004/051316 ("WO '316"). The streamer cleaning device described in WO '316 includes a housing configured to be affixed to the exterior of the streamer, a vane or similar device affixed to the housing causes the housing to move longitudinally along the streamer as the streamer is towed in the water. A friction drive, consisting of a series of wheels placed in contact with the outer surface of the streamer, converts the longitudinal motion of the housing to rotational energy to operate rotating brushes placed in contact with the streamer.

Another type of automatic streamer cleaning device is described in U.S. patent application Ser. No. 11/227,795 filed on Sep. 15, 2005 and assigned to the assignee of the present invention. The streamer cleaning device disclosed in the '795 application includes a housing that is configured to be removably affixed to the exterior surface of the streamer. The housing includes at least one vane arranged to convert motion of the water therepast, as the streamer is towed into the water, into longitudinal force and rotational force on the housing. Such forces cause the housing to move longitudinally and rotationally about the entire exterior of the streamer. At least one cleaning element, such as a brush or scraper, is disposed inside the housing. The imparted motion of the housing causes corresponding motion of the cleaning element, thus cleaning the streamer.

The cleaning devices described in both WO '316 and in the '795 application are only able to move toward the back end of the streamer using energy generated by movement of water past the cleaning device as the streamer is towed through the water. In order to use either of the forgoing cleaning devices more than once on a streamer, it is necessary to remove the cleaning device from the aft end of the streamer, and reaffix the cleaning device at or near the front end of the streamer.

SUMMARY OF THE INVENTION

One aspect of the invention is a cleaning device for a seismic streamer. A cleaning device according to this aspect of the invention includes a housing placeable about the exterior of a seismic streamer. At least one turbine is associated with the housing and is configured to be rotationally driven by movement of the streamer through a body of water. At least one drive element is associated with the housing and is configured to convert rotational motion of the at least one turbine to motive power to move the housing along the streamer. At least one cleaning element is associated with the housing and is cooperatively engageable with the exterior of the seismic streamer.

A method for cleaning a marine streamer according to another aspect of the invention includes towing the streamer through a body of water. Motion of water past a cleaning device disposed on the streamer is converted into motive power to move the cleaning device along the streamer.

Other aspects and advantages of the invention will be apparent from the following description and the appended claims.

DETAILED DESCRIPTION

Figure 1:
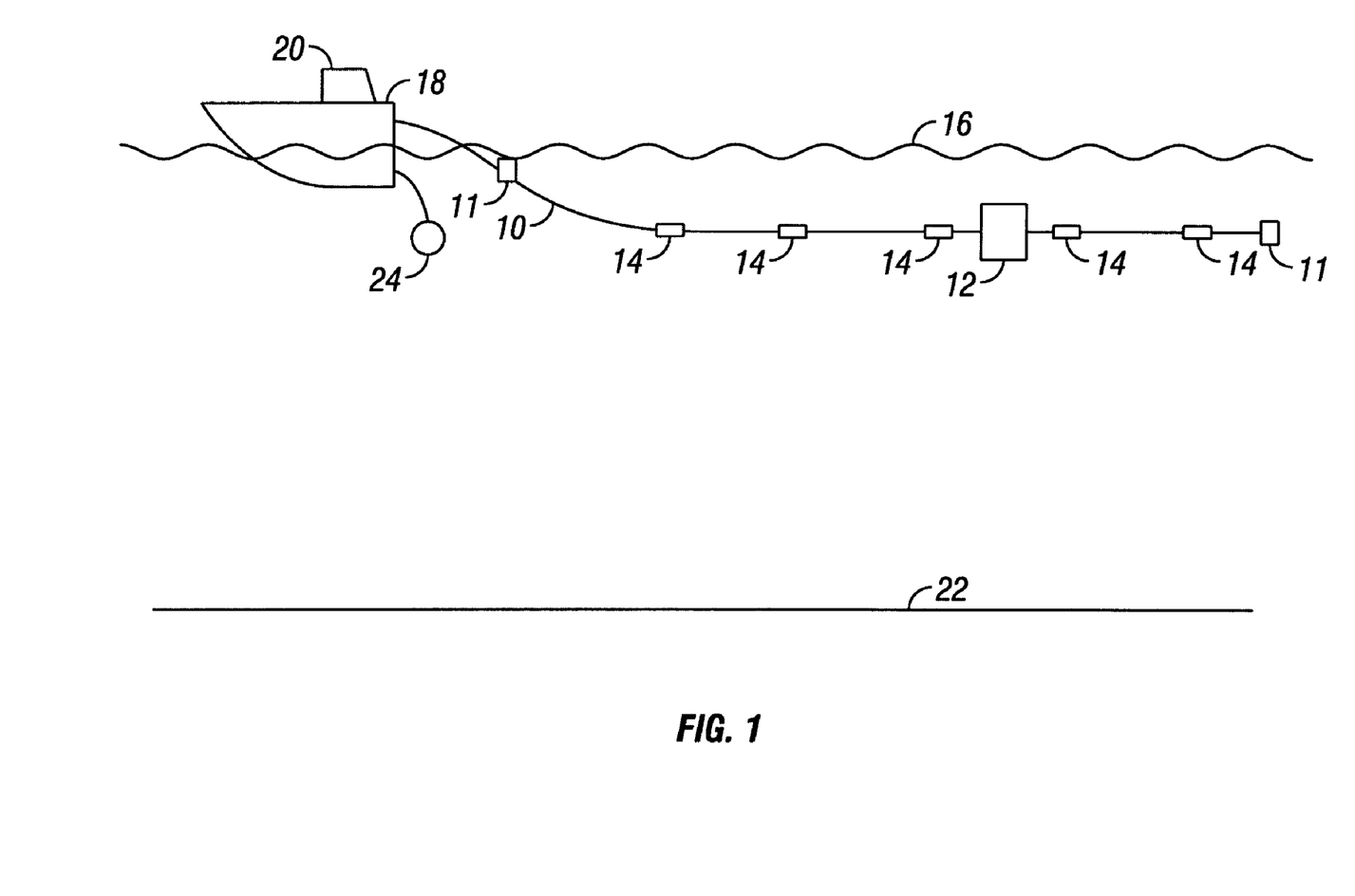
FIG. 1 shows one embodiment of a streamer cleaning device according to the invention as it is typically used on a seismic streamer.

FIG. 1 shows an automatic seismic streamer cleaning device as it is typically used on a marine seismic streamer. A seismic vessel 18 tows a marine seismic streamer 10 near the surface of a body of water 16. For purposes of familiarization, the seismic vessel 18 may include thereon various seismic data acquisition, data recording and navigation equipment, shown generally at 20 and collectively referred to as a "recording system", which controls operation of a seismic energy source 24, and records signals detected by various sensors 14 in the streamer 10. Energy emitted by the source 24 is reflected by various structures (not shown) below the bottom 22 of the body of water 16. Such reflected energy is ultimately detected by the sensors 14 on the streamer 10 for recording by the recording system. The example implementation shown in FIG. 1 includes only one streamer, however it is known in the art for a single vessel to tow a plurality of streamers at laterally spaced apart positions behind the seismic vessel or another vessel. Accordingly, the actual configuration of vessels and streamers is not a limitation on the scope of the invention.

As is known in the art, the streamer 10 typically includes an outer, generally cylindrically shaped jacket which may be made from a flexible, acoustically transparent material such as polyurethane. Inside the jacket, the streamer 10 includes one or more strength members (not shown separately). Coupled to the strength members at spaced apart locations are flotation spacers (not shown separately) which provide the streamer 10 with a selected degree of buoyancy in the water 16. Some of the spacers (not shown) can include therein the one or more seismic sensors, shown schematically at 14 and which may be hydrophones, geophones or any other sensing device used to detect seismic energy. In a typical streamer, the foregoing components extend for a selected length, usually about 75 meters, in a so called "segment" before being terminated at each axial end thereof with some form of connector. A streamer may be formed from as many as 100 or more such interconnected segments. Thus, the majority of the length of the streamer 10 presents a substantially constant diameter, generally cylindrical exterior surface for application of various devices, including an automatic cleaning device 12 according to the invention. In some embodiments, the streamer 10 may include a stop 11 disposed at selected positions along the streamer 10 where motion of the cleaning device 12 is to be stopped or reversed during ordinary operation. The stops 11 are configured to cooperatively act with certain features, to be explained further below with reference to FIGS. 6 and 7 to cause motion of the cleaning device 12 to reverse along the streamer 10.

One embodiment of an automatic streamer cleaning device is shown in various perspective views in FIGS. 2 through 5. In each of FIGS. 2 through 5, some of the components may not be shown that are shown in others of the figures to better illustrate those components that would be obscured by the components not shown because of the perspective of the illustration. However, FIGS. 2 through 5 show the same embodiment.

Figure 2:
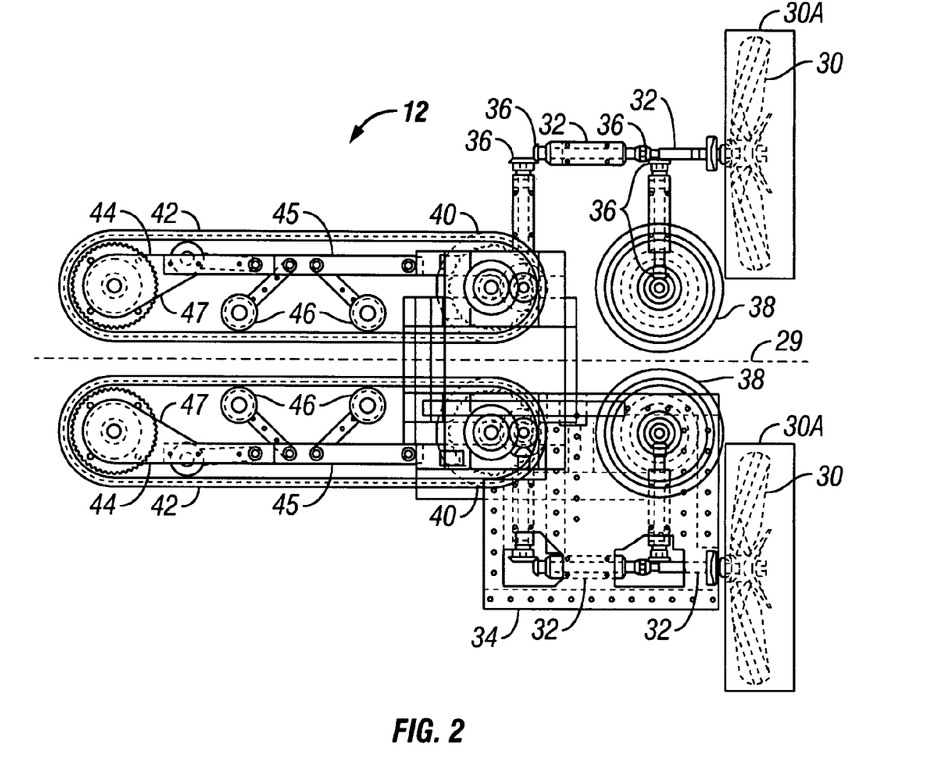
FIGS. 2 through 5 show various perspective views of one embodiment of a streamer cleaning device according to the invention.

FIG. 2 shows a plan or top view of principal components of the present embodiment of a streamer cleaning device 12. The embodiment shown in FIG. 2 can be substantially symmetric about a center line 29 of the cleaning device 12, and thus all the components described with respect to one side of the center line 29 may have identical counterparts symmetrically disposed on the other side of the center line 29. As will be further explained below, the two symmetric parts of the cleaning device 12 may be pivotally closed over the streamer to affix the cleaning device 12 to the streamer (10 in FIG. 1).

A drive shaft support frame 34 rotatably supports a plurality of drive shafts 32. An aftmost one of the drive shafts 32 is rotationally coupled to a turbine 30. In the most general sense, the turbine 30 converts energy of motion of the cleaning device through the water into motive power to drive the cleaning device 12 along the streamer. The turbine 30 in the present embodiment converts motion of the water, as the streamer with the cleaning device 12 attached thereto is moved through the water, to rotational motion imparted to the respective drive shaft 32. The turbine 30 may be surrounded by a guard 30A to reduce the possibility of turbine damage from the turbine 30 coming into contact with foreign objects. Others of the drive shafts 32, as shown in FIG. 2, can be rotationally coupled through cooperatively arranged pairs of bevel gears 36 to rotate a rotary cleaning element 38. The rotary cleaning element 38 can be rotatably supported by the driveshaft support frame 34. The rotary cleaning element 38 may be a bristle brush, a scraper or any other device that can clean the exterior of the streamer. In the present embodiment, rotational motion of the turbine 30 is ultimately converted to rotational motion of the rotary cleaning element 38.

Others of the drive shafts 32 may be arranged, through corresponding pairs of bevel gears 36 to rotate a tractor drive wheel 40. The tractor drive wheel 40 is in frictional contact on its exterior surface with a tractor drive belt 42. The tractor drive belt 42 can be cooperatively arranged as shown in FIG. 2 with both the tractor drive wheel 40 and a tractor idler wheel 44. The tractor drive wheel 40 and the tractor idler wheel 44 define the ends of the path of travel of the tractor drive belt 42. The tractor drive belt 42 is placed in frictional contact with one side of the exterior of the streamer (see 10 in FIG. 5). As may be inferred from the foregoing description and what is shown in FIG. 2, corresponding, symmetric structures to the foregoing may exist on the other side of the center line 29, such that when the cleaning device 12 is affixed the to the streamer, two opposed tractor drive belts 42 are in frictional contact with the exterior of the streamer.

As explained above, the components on one side of the center line 29 may be replicated symmetrically on the other side of the center line 29. Thus, as the turbines 30 cause respective drive shafts 32 to rotate the respective tractor drive wheels 40, the tractor drive belts 42 are caused to move, thus moving the cleaning device 12 along the exterior of the streamer 10. The drive direction can be the same as that provided by the rotary cleaning elements 38, such that the rotary cleaning elements 38 can assist in moving the cleaning device 12 along the streamer. It is contemplated that the respective tractor idler wheels 44 will be located at a sufficient longitudinal distance from the corresponding tractor drive wheel 40 so that the tractor drive belt 42 will traverse a length of the streamer sufficient to frictionally drive the cleaning device 12 along the streamer without the need to undue clamping force between the two drive belts 42.

The tractor idler wheels 44 may also be arranged, using drive belts 47 or other driving arrangement, to rotate additional tractor idler wheels 46. The additional tractor idler wheels 46 are provided in the present embodiment to improve frictional contact between the drive belts 42 and the streamer. The tractor drive wheel 40, tractor idler wheel 44 and additional tractor idler wheels 46 can all by rotatably mounted on a tractor frame 45. The tractor frame 45 may be coupled directly or through additional structures to the driveshaft support frame 34.

Figure 3:
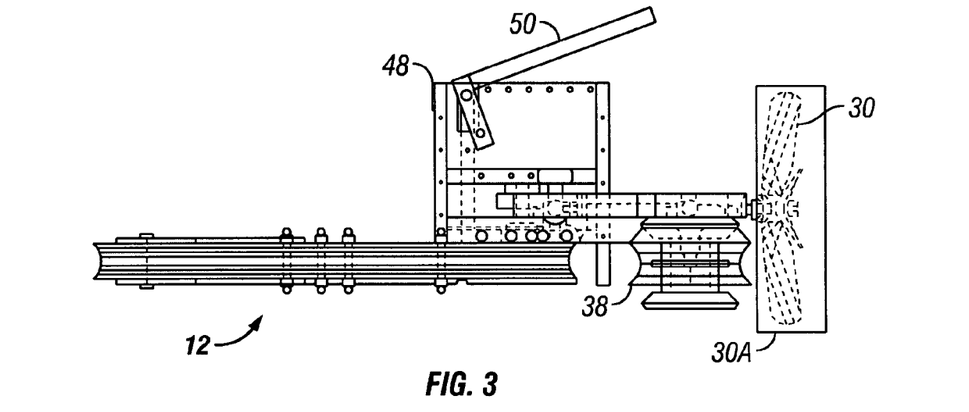
Figures 4, 5:
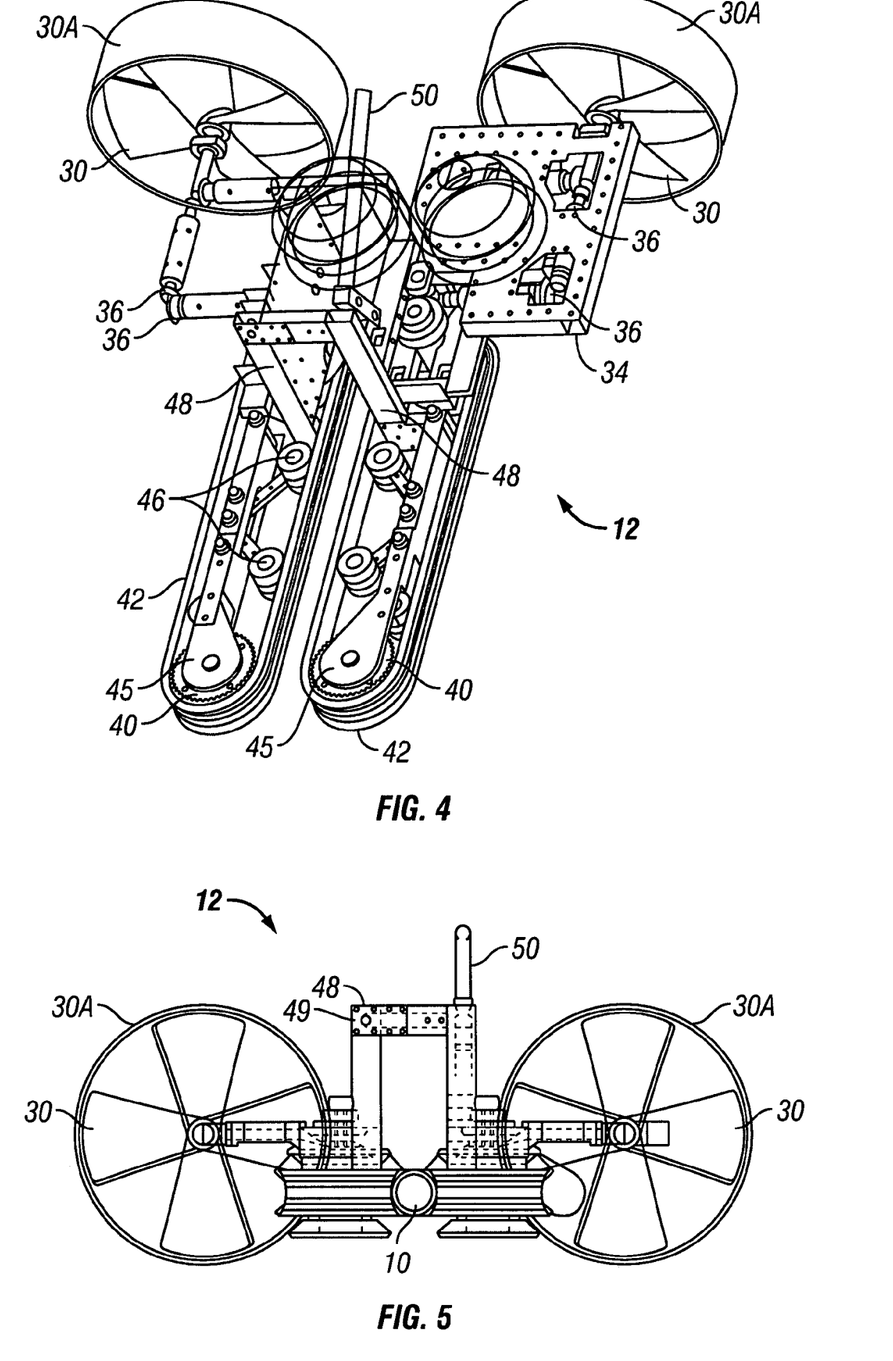

A side view of the cleaning device 12 as in FIG. 3 shows a hinged housing 48 that joins the two symmetrically disposed parts of the cleaning device 12 (on either side of the center line 29), particularly including the driveshaft support frames 34, so as to be removably affixed to the streamer. The cleaning device 12 may be affixed to and removed from the streamer by a user moving a handle 50 arranged to pivotally move one side of the housing 48 away from the other. An arrangement of such a pivot is shown at 49 in FIG. 5. The housing 48 may be an open framework as shown in FIGS. 2 through 5. The function performed by the housing 48 in the present embodiment is to removably affix the cleaning device 12 to the streamer. It is within the scope of this invention for the housing 48 to exclude pivot features such as shown in FIG. 3 and FIG. 5, such that affixing and removing the cleaning device 12 from the streamer would require moving an end of the streamer through the cleaning device 12.

The housing 48 shown in FIGS. 2 through 5 may be an open framework. In other embodiments, the housing may also be in the form of an enclosure shaped to reduce drag in the water, wherein the functional components explained above are substantially enclosed in the housing. As used in the present description, the term housing is intended to encompass both an enclosure and an open frame, or combinations thereof.

An oblique view of the cleaning device 12 in FIG. 4 shows the relative placement of the above described components.

Figure 8:
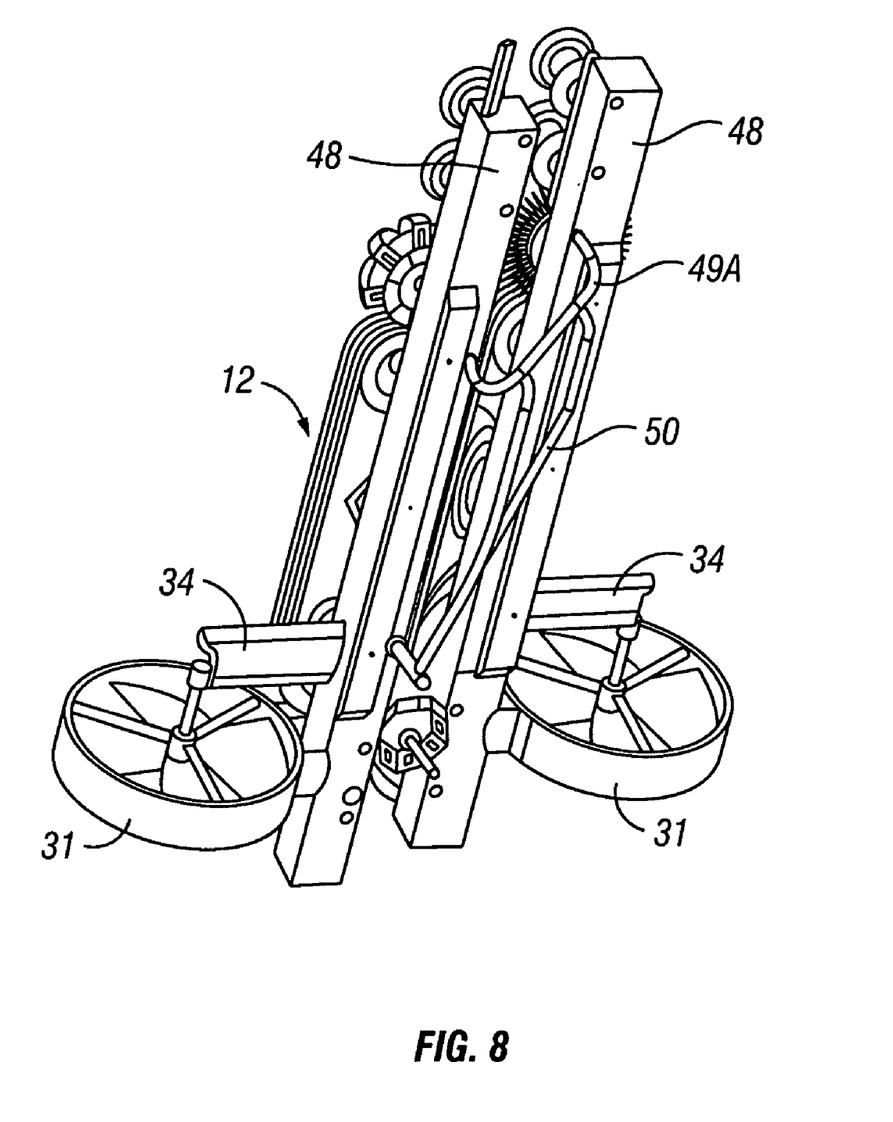
FIGS. 8 and 9 show oblique views of another example of a mechanism to enable affixing and removing the cleaning device from a streamer.
Figure 9:
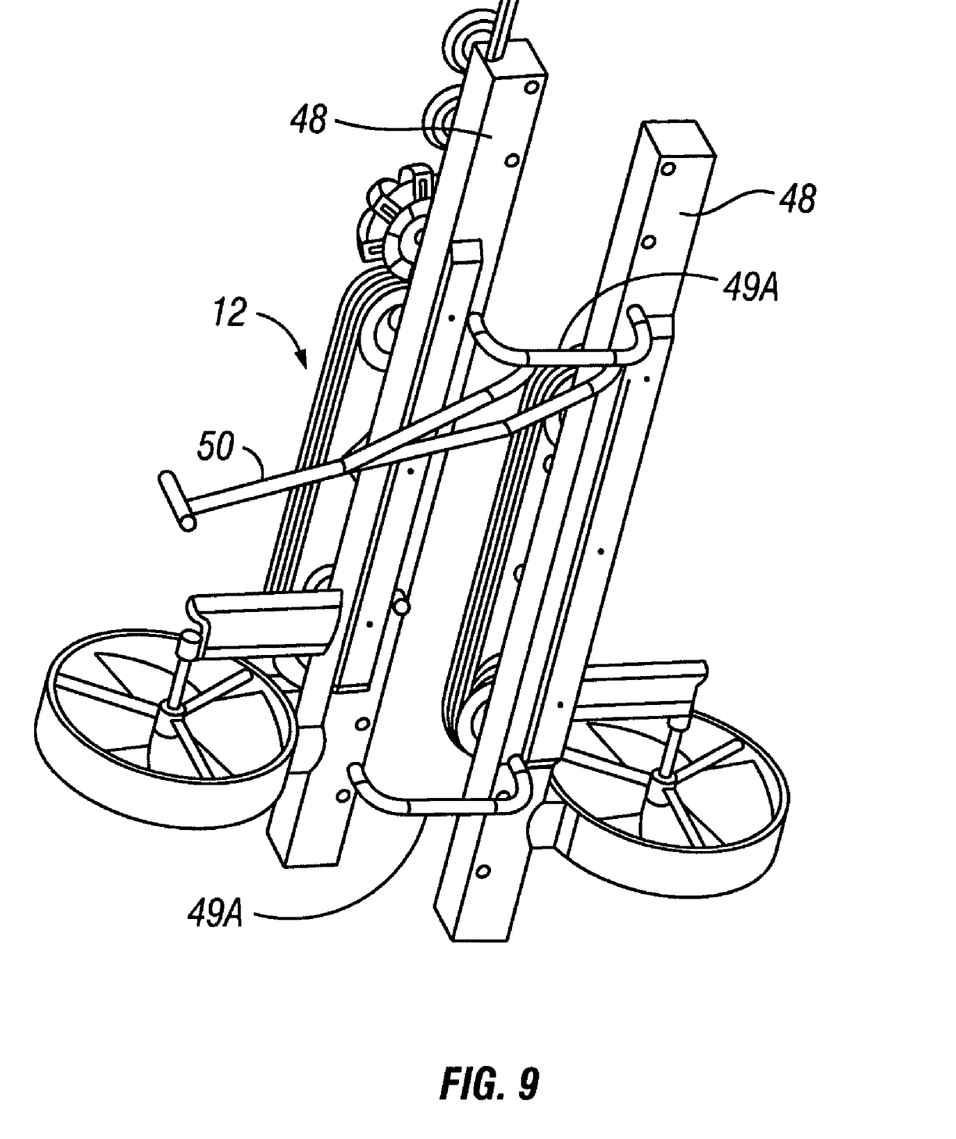

Another example of a mechanism to enable affixing and removing the cleaning device 12 from a streamer is shown in FIGS. 8 and 9. FIGS. 8 and 9 show, respectively, the cleaning device 12 in its closed or affixed position and in its open position. In FIG. 8, the housing 48 is shown in the form of a rectangular block extending along the longitudinal dimension of the cleaning device 12, such dimension being essentially parallel to the streamer. The housing 48 disposed on each side of the streamer has inserted in an upper (or lower) surface thereof one side of a generally U-shaped a pivot 49A. The pivot 49A shown in FIG. 8 can be disposed generally toward one longitudinal end of the cleaning device 12. Another such pivot (see FIG. 9) can be disposed at the aft end of the housing 48. Each leg or side of the pivot 49A is cooperatively arranged with a respective housing 48 so that the pivot 49A can rotate in a direction perpendicular to the longitudinal dimension of the respective housing 48. As shown in FIG. 8, when the cleaning device 12 is affixed to the streamer (not shown in FIG. 8), the pivot 49A is arranged such that one side thereof is at a different longitudinal position along the cleaning device 12 than on the side. The corresponding pivot (see FIG. 9) disposed generally toward the other longitudinal end of the cleaning device 12 can be arranged such that each side thereof has the same relative longitudinal relationship as the pivot 49A shown in FIG. 8.

The handle 50 may be coupled to the pivot 49A shown in FIG. 8 such that rotation of the handle 50 in a plane generally perpendicular to the rotation of the two sides of the pivot 49A causes the pivot 49A to rotate relative to the two housings 48. Because of the longitudinal relationship of the two sides of the pivot 49A, when the pivot 49A is rotated by the handle 50, the orientation of the pivot 49A with respect to each of the two housings 48 is changed such that the lateral distance between the housings is changed. Thus, when the handle 50 is rotated in one direction, the corresponding rotation of the pivot 49A causes the housings 48 to separate laterally.

Referring to FIG. 9, the other of the two pivots 49A not previously shown in FIG. 8 can be observed. By suitably placing the two pivots 49A along the longitudinal dimension of the housings 48 as explained above, the two housings 48 may be caused to move in a parallelogram manner. Thus, when the handle 50 is rotated to the position shown in FIG. 9, the two housings 48 may be laterally separated by a similar amount at each longitudinal end, so as to enable removing the cleaning device 12 from the streamer.

Figure 6:
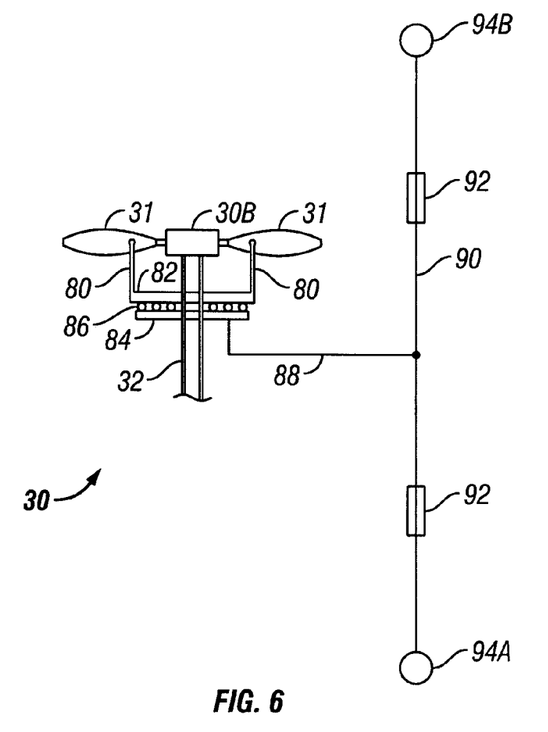
FIG. 6 shows a device for reversing turbine blade pitch to reverse direction of rotation.

It will be appreciated by those skilled in the at that once the cleaning device 12 reaches the end of its travel along a streamer, it will be necessary to reverse the direction of movement to maintain automatic operation. A mechanism that can provide automatic reversal of direction is shown schematically in FIG. 6. One of the turbines 30 is shown in FIG. 6 coupled to its respective drive shaft 32. In the present embodiment, the turbine blades 31 are mounted in a turbine hub 30B such that their pitch may be changed. Changeable pitch may be attained in some embodiments by mounting the blades 31 in the hub 30B so that the blades 31 may be rotated about their respective mounting axes in the hub 30B. In principle, such mounting is similar to the mounting of helicopter rotor blades such that the blade pitch can be controlled. Actual rotation of each blade 31 about its respective mounting axis may be performed by a link 80 affixed at one end to each blade such that motion along the longitudinal dimension of the cleaning device will rotate the blades 31 accordingly. Each blade 31 will have a respective link 80. The links 80 may all terminate at their other ends in a pitch rotator plate 82 disposed around the drive shaft 32. The pitch rotator plate 82 thus rotates coaxially with the turbine 30. A pitch adjuster thrust plate 84 is coupled to the pitch rotator plate through a bearing 86 such that the pitch adjuster thrust plate 84 may remain rotationally fixed, while the pitch rotator plate 82 is free to rotate with the turbine 30. Longitudinal motion of the pitch adjuster thrust plate 84, however, is directly transferred to the pitch rotator plate 82. The pitch adjuster thrust plate 84 may be coupled through a link 88 to a direction reversing arm 90. The direction reversing arm 90 may be slidably supported in linear bearings 92 mounted on the frame (34 in FIG. 2). A contact 94A, 94B may be disposed at each end of the direction reversing arm 90.

When the cleaning device 12 reaches the end of its travel in one direction along the streamer, the one of the contacts 94A, 94B closest to the respective end of the streamer may com into contact with a stop (11 in FIG. 1) positioned on the streamer. When the respective one of the contacts 94A, 94B strikes the respective stop (11 in FIG. 1) the direction reversing arm 90 is moved. Such motion is transferred to the pitch adjuster thrust plate 84 by the link 88, and thus ultimately causes the turbine blade pitch to change. Such blade pitch change may cause the rotation direction of the turbine 30 to reverse. By reversing the rotation direction of the turbine 30, the movement of the cleaning device will also be reversed.

As the cleaning device now moves in the opposite direction along the streamer, and eventually reaches the other stop (11 in FIG. 1), the other of the contacts 94A, 94B will strike the other stop, and thus once again change the turbine blade pitch so as to reverse rotation of the turbine 30. Thus, the cleaning device 12 may travel from end to end of the streamer with no required operator intervention.

The elements shown in FIG. 6 are disposed on one side of the center line (29 in FIG. 2) of the cleaning device 12. As explained above with reference to FIGS. 2 through 5, symmetrically placed, substantially identical components may be disposed on the other side of the center line (29 in FIG. 2).

It will be readily appreciated by those skilled in the art that by appropriate selection of turbine 30 parameters, such as blade diameter, numbers of blade and pitch of the blades, enough rotational energy can be generated by movement of the cleaning device 12 through the water to move the cleaning device 12 in a direction toward the front of the streamer (toward the seismic vessel).

Figure 7:
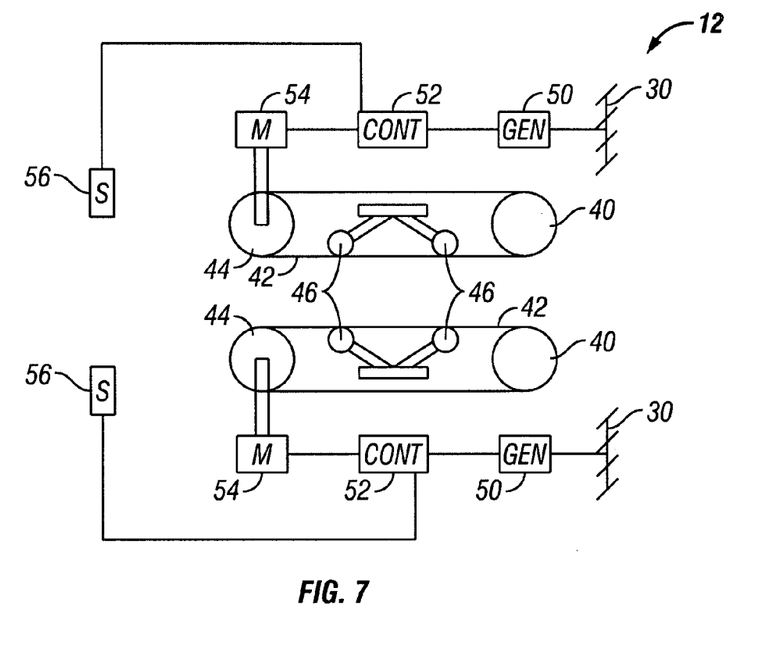
FIG. 7 shows a functional block diagram of another embodiment of an automatic streamer cleaning device.

An alternative embodiment of a streamer cleaning device is shown schematically in FIG. 7, that does not require changing turbine blade pitch to change direction of movement of the cleaning device. In the embodiment shown in FIG. 7, the turbines 30 each can drive a respective electric generator or alternator 50. Electric power generated by the respective generators 50 may be used to operate a respective controller 52 and electric motor 54. Each electric motor 54 may be arranged to rotate one of the tractor wheels (either drive wheel 40 or idler wheel 44). The direction of rotation of each motor 54 may be selected by the respective controller 52. Each controller 52 may be in signal communication with any form of proximity detector, switch or other device 56 that signals to the respective controller 52 that the end of travel of the cleaning device 12 in one direction is reached. Upon such signal, the controllers 52 will operate their respective motors 54 in the opposite direction of rotation to reverse direction of motion of the cleaning device 12 along the streamer.

Still other embodiments may include a reversible gear set coupled between the respective turbines 30 and the tractor wheels.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic streamer cleaning device, comprising:
   a housing placeable about the exterior of a seismic streamer;
   at least one turbine associated with the housing and configured to be rotationally driven by movement of the streamer through a body of water;
   at least one drive element associated with the housing and configured to convert rotational motion of the at least one turbine to motive power to move the housing along the streamer; and
   at least one cleaning element associated with the housing and cooperatively engageable with the exterior of the seismic streamer.

2. The cleaning device of claim 1 wherein the at least one drive element comprises a drive shaft rotationally coupled to the at least one turbine and a drive wheel placeable in frictional contact with the streamer, the drive shaft rotationally coupled to the drive wheel.

3. The cleaning element of claim 1 wherein the at least one drive element comprises a tractor drive wheel in driven arrangement with the at least one driveshaft, a tractor idler wheel spaced apart from the tractor drive wheel, and a tractor drive belt cooperatively arranged with the tractor drive wheel and the tractor idler wheel, the tractor drive belt placeable in frictional contact with the exterior of the streamer to move the housing along the streamer.

4. The cleaning device of claim 1 further comprising a pitch control mechanism associated with the at least one turbine, the mechanism configured to adjust the pitch of the turbine to reverse a direction of rotation thereof, whereby a direction of motion of the housing along the streamer is reversed.

5. The cleaning device of claim 4 further comprising a contact cooperatively arranged with the pitch control mechanism and extending from the housing such that when the contact reaches and end of travel stop along the streamer, the pitch control mechanism is actuated to reverse the direction of rotation of the turbine.

6. The cleaning device of claim 1 wherein the at least one cleaning element comprises a rotatable brush.

7. The cleaning device of claim 1 wherein the at least one drive element comprises an electric generator rotationally coupled to the at least one turbine, a controller, and an electric motor in driving arrangement with at least one of a drive wheel and a tractor drive wheel, the controller configured to operate the electric motor to rotate the at least one of a drive wheel and a tractor drive to cause motion of the housing along the streamer.

8. The cleaning device of claim 1 wherein the housing includes two housing segments, the housing segments pivotally coupled to each other to enable lateral removal of the cleaning device from the streamer.

9. The cleaning device of claim 8 wherein the housing segments are coupled by two, longitudinally spaced apart, substantially U-shaped pivots, one end of each pivot affixed to a respective housing segment at a longitudinal position such that rotation of one pivot causes substantially equal lateral separation of the housing along a longitudinal dimension of the housing.

10. A method for cleaning a marine streamer, comprising:
    towing the streamer through a body of water;
    converting motion of water past a cleaning device into motive power to move the cleaning device along the streamer;
    using the motive power to move the cleaning device along the streamer in a direction along which the streamer is towed.

11. The method of claim 10 further comprising reversing direction of the moving the cleaning device when the cleaning device reaches a first predetermined position along the streamer, and using the motive power to move the cleaning device in a direction opposite to the towed direction until the cleaning device reaches a second predetermined position along the streamer.

12. The method of claim 10 wherein the converting comprises passing the moving water through a turbine.

13. The method of claim 12 wherein the converting comprises rotationally coupling rotation of the turbine to at least one of a drive wheel and a tractor drive in frictional contact with the streamer.

14. The method of claim 12 wherein the converting comprises rotationally coupling the turbine to a generator, and functionally coupling an output of the generator to a motor, an output of the motor rotationally coupled to at least one of a drive wheel and a tractor drive in frictional contact with the streamer.

15. A method for cleaning a marine streamer, comprising:
    towing the streamer through a body of water;
    rotating at least one turbine by movement of the streamer though the body of water;
    coupling rotational motion of the at least one turbine to at least one drive element associated with a housing disposed on an exterior of the streamer to move the housing along the streamer;

engaging at least one cleaning element associated with the housing with the exterior of the seismic streamer as the housing is moved along the streamer to clean said seismic streamer.

16. The method of claim 15 further comprising reversing direction of motion of the housing along the streamer when the housing reaches a predetermined position along the streamer.

17. The method of claim 15 wherein the coupling rotational motion comprises rotationally coupling the turbine to a generator, and functionally coupling an output of the generator to a motor, an output of the motor rotationally coupled to the at least one drive element.

18. The method of claim 15 wherein the coupling rotational motion comprises rotationally coupling the turbine through at least one drive shaft to the at least one drive element.

19. The method of claim 15 further comprising coupling rotational motion of the turbine to the at least one cleaning element to cause rotation thereof.

* * * * *